Figure 1:
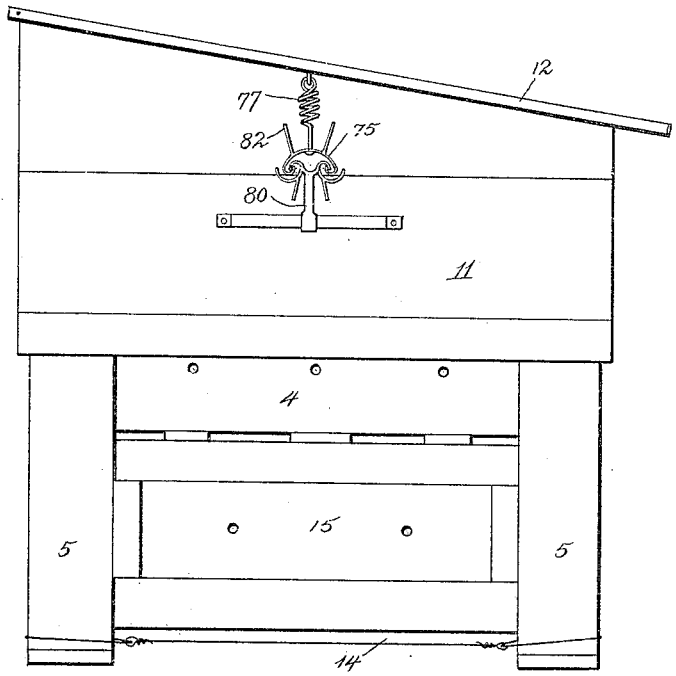

E. HAINS.
BEEHIVE.
APPLICATION FILED APR. 19, 1913.

1,131,834.

Patented Mar. 16, 1915.
5 SHEETS—SHEET 1.

Witnesses

Inventor:
Edson Hains

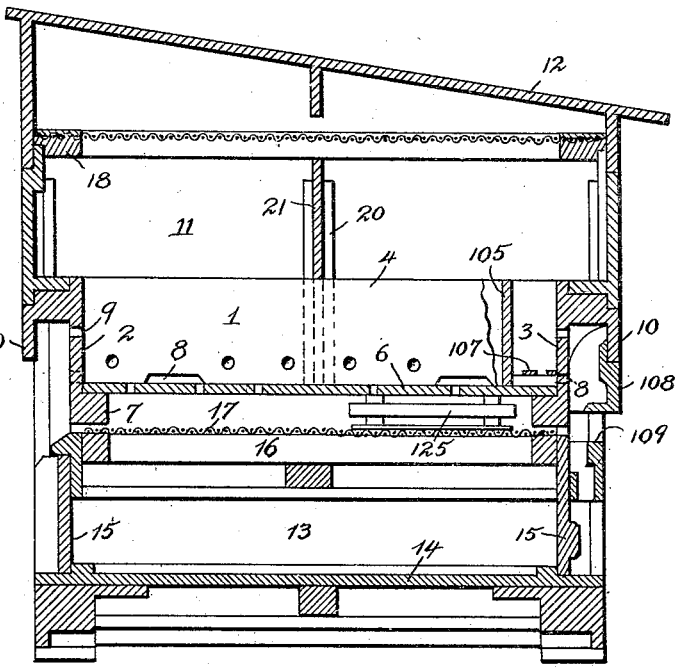
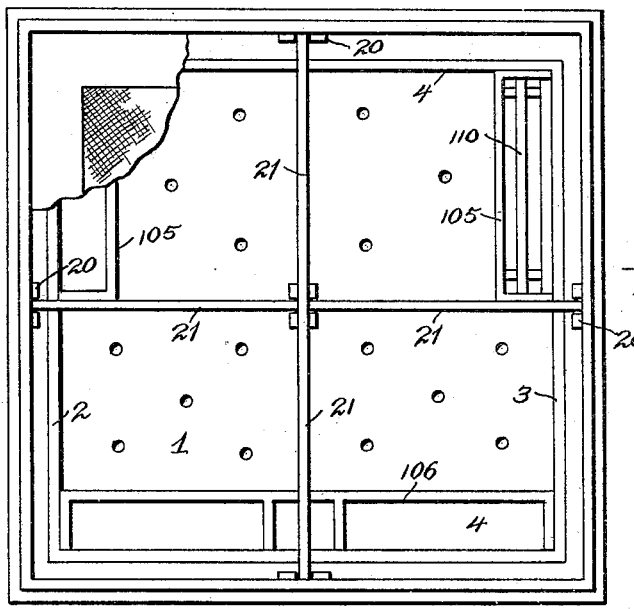

E. HAINS.
BEEHIVE.
APPLICATION FILED APR. 19, 1913.

1,131,834.

Patented Mar. 16, 1915.
5 SHEETS—SHEET 3.

Witnesses:

Inventor:
Edson Hains

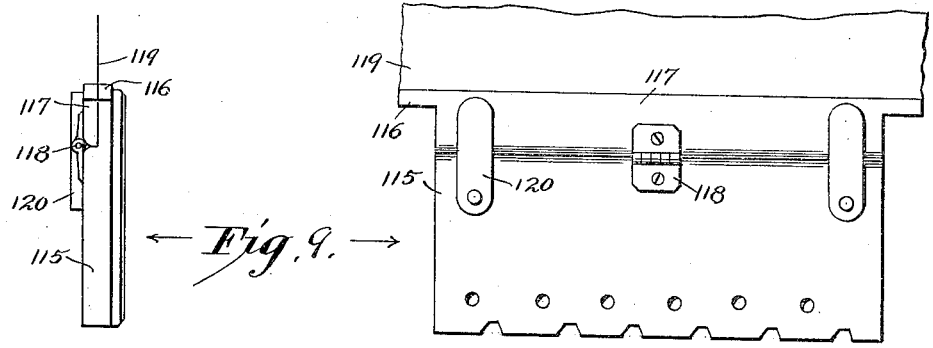

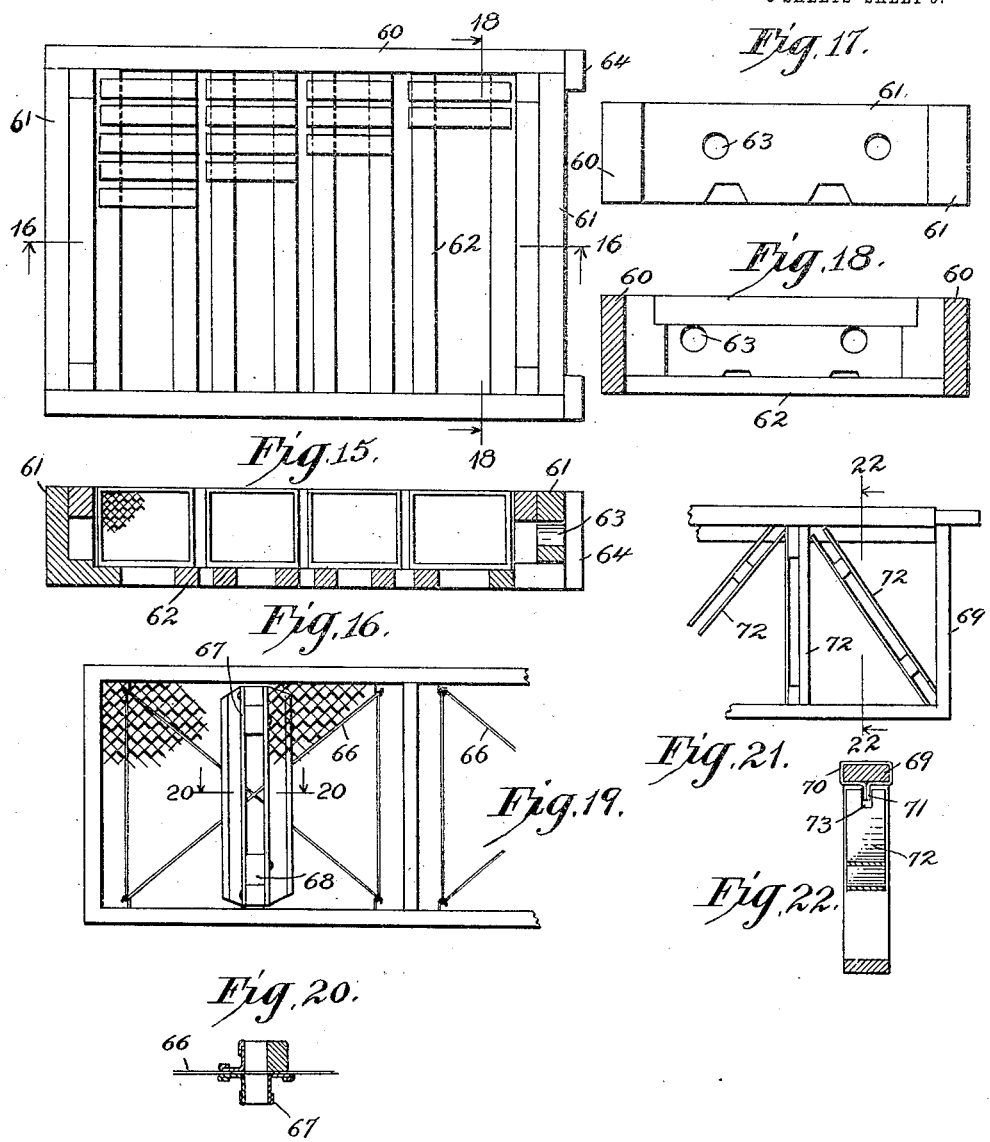

UNITED STATES PATENT OFFICE.

EDSON HAINS, OF BEDFORD, OHIO.

BEEHIVE.

1,131,834.  Specification of Letters Patent.  Patented Mar. 16, 1915.

Application filed April 19, 1913. Serial No. 762,161.

*To all whom it may concern:*

Be it known that I, EDSON HAINS, a citizen of the United States, residing at Bedford, in the county of Cuyahoga and State of Ohio, have invented a certain new and useful Improvement in Beehives, of which the following is a full, clear, and exact description, reference being had to the accompanying drawings.

This invention relates to bee hives and appliances therefor and has for its general purpose the provision of a device of this character which shall permit the bee keeper to dispense entirely with mechanical extractors while facilitating honey transfer by the bees themselves.

It is a well known fact that comb honey is worth more in the market than extracted honey. Also it is well known that bees do not naturally take kindly to the small square comb-sections of commerce but will store very much larger amounts of honey in larger comb units such as the bees would make in a state of nature. Bees under proper conditions are capable of a vast amount of work and will move and store up a great quantity of honey in case appliances be provided that shall take advantage of their peculiarities. Thus my observations have shown that the use of large combs during the flowering season will result in the production of an amount of honey so much larger than in the use of small combs as to render it profitable to transfer this honey to small combs after the end of the flowering season, in case the bees themselves can be persuaded to do the work. Also at the prevailing difference in value between comb honey and extracted honey there is a dependable margin of profit in inducing the bees to transfer the extracted honey into combs. In addition the bees fare noticeably better during the winter if fed upon honey or other partially predigested food than if fed upon raw sugar, although if the sugar be fed to them during the late summer or early fall they will work it over and store it in combs in partially predigested form, amply suitable for winter nourishment and permitting all the salable honey in the hive to be withdrawn and sold. This can be accomplished only before the setting in of cold weather and in addition to the freeing of the valuable honey for sale purposes results in the production of a noticeable amount of beeswax and comb, thus dispensing with the necessity of purchasing so much of this material in the spring. All of these acts depend upon the native or instinctive peculiarities of the bee and it is only by taking advantage of these peculiarities that their energy can be turned into practical account. For example, bees know instinctively the value of sweets and will suffer labor and pain to prevent the loss or damage thereof. If bees find sweets that are apparently exposed or in a dangerous place they will put forth great exertions to transport them to some place where they will be safe and will store them in the manner which their instinct tells them is most dependable, viz, in a comb. On the other hand if the bees find any sweets in a place which strikes them as being safe and suitable their tendency is to inhabit there and add more stores to those already present.

Accordingly the object of the present invention is the provision of a construction and arrangement of hive which shall take advantage of the peculiarities of the bees so as: (*a*) to induce them to transfer honey rapidly and efficiently from unmarketable combs or from bulk-extract to marketable comb; (*b*) to induce them to lay up winter stores made from sugar in the summer and early fall so as to obtain winter provisons and a by product of wax; (*c*) to induce the bees to store all their honey in the places designed therefor; (*d*) to increase the length of the working season by providing better warmth and ventilation adjacent the comb; (*e*) to increase the tendency toward working by moving the center of population of the hive nearer to the comb; (*f*) to permit a plurality of colonies to be wintered in one structure so as to economize on the warmth produced by the various clusters of bees; (*g*) to permit a plurality of queens to be wintered in one colony and without the necessity for opening the hive and separating the colonies at so early a date in the spring as hitherto; (*h*) to retard spring swarming; (*i*) to permit a greater facility of access to the comb sections; (*j*) while further objects and advantages of the invention will become apparent as the description proceeds.

Figure 2:
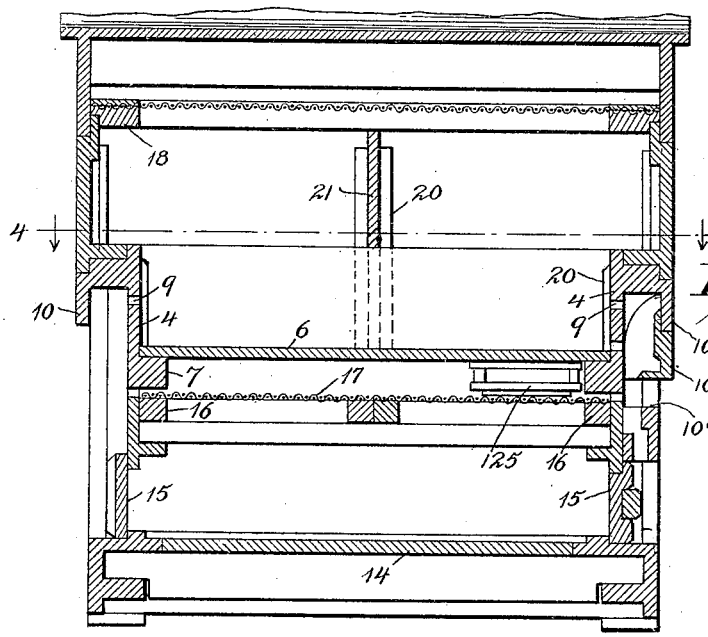
Figure 5:
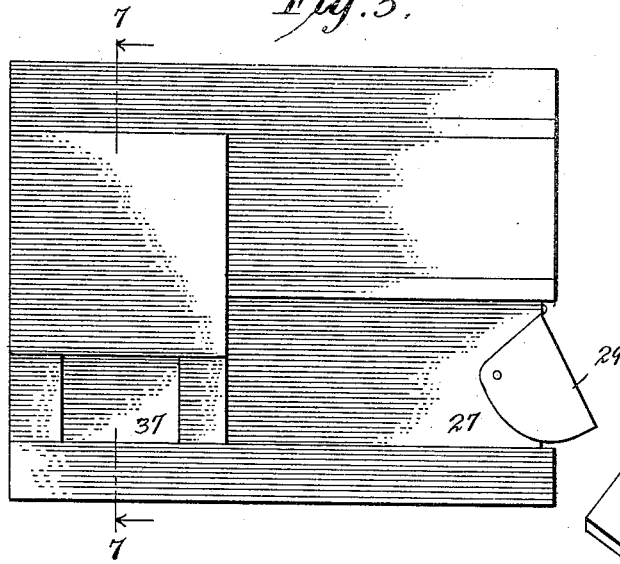
Figure 8:
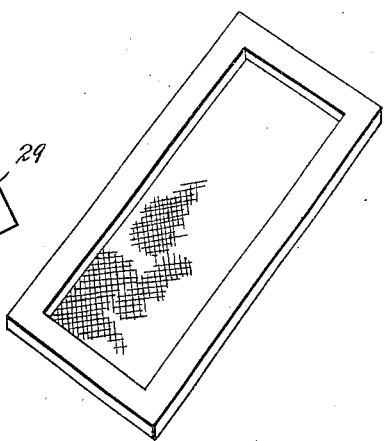
Figures 6, 7:
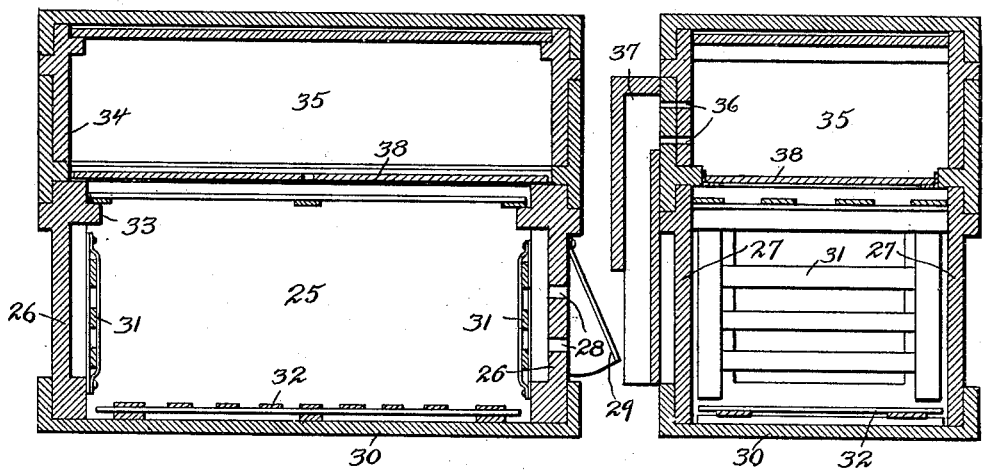

Certain constructions and arrangements whereby the above named objects may be attained are illustrated in the drawings accompanying and forming a part of this application, wherein:

Figure 1 is an end elevation of one form of hive constructed in accordance with my invention; Fig. 2 is a vertical, cross-sectional view of the said hive taken upon a line parallel with the roof; Fig. 3 is a vertical, transverse, cross-sectional view taken through the hive shown in Fig. 1 upon a line perpendicular to the section of Fig. 2; Fig. 4 is a horizontal, cross-sectional view of the same hive taken upon the line 4—4 of Fig. 2 and looking downwardly; Fig. 5 is a side elevation of a super adapted to be employed with the hive shown in the preceding views; Fig. 6 is a vertical, longitudinal, cross-sectional view taken through the super shown in Fig. 5; Fig. 7 is a vertical, transverse, cross-sectional view of the super shown in Fig. 5 taken upon the dotted line 7—7 and looking in the direction of the arrows; Fig. 8 is a perspective view of a honey board which may be used with the super shown in Figs. 5, 6, and 7; Fig. 9 is a side elevation and end elevation of a division board which may be used with my improved hive; Fig. 10 is a side elevation and end elevation of a form of frame for holding comb sections within the super; Fig. 11 is a side elevation of a comb frame designed especially for the attic of the super; Fig. 12 is a view and end elevation of two adjacent frames constructed in accordance with Fig. 11 and showing the construction and operation of the spacing and guiding clips; Fig. 13 is a detail view of one of the clips taken upon the line 13—13 of Fig. 11 and looking downwardly; Fig. 14 is a detail view of another spacing clip taken upon the line 14—14 of Fig. 11 and looking downwardly; Fig. 15 is a plan view of a modified form of super which may be placed in the upper chamber shown in Fig. 2 instead of the super shown in Fig. 5; Fig. 16 is a vertical, longitudinal, cross-sectional view taken upon the line 16—16 of Fig. 15 and looking in the direction of the arrows; Fig. 17 is a right hand end elevation of the device shown in Fig. 15; Fig. 18 is a vertical, transverse, cross-sectional view taken upon the line 18—18 of Fig. 15 and looking in the direction of the arrows; Fig. 19 is a detail view showing a modified form of brood comb together with a form of adjustable spacer whereby a passageway is assured through an intermediate portion of the comb; Fig. 20 is a detail view taken upon the line 20—20 of Fig. 19 and looking in the direction of the arrows; Fig. 21 is a detail view showing a modified form of brood frame and spacers together with the means for securing same in place; and Fig. 22 is a cross-sectional view of the frame taken upon the line 22—22 of Fig. 21 and looking in the direction of the arrows.

Describing the parts by reference characters my improved hive consists preferably of a substantially rectangular box 1 having a front wall 2, a rear wall 3, and side walls 4—4 and suitably supported as by legs 5—5. The bottom of the chamber 1 is formed by a perforated floor 6 suitably supported as by ledges 7 and in the walls 2, 3 or 4 immediately above this floor is formed the openings or entrance whereby ingress and egress is permitted. In the present case this opening is illustrated in the rear wall 3 at the point 8 although obviously it could be formed in any portion of the wall. Perforations 9—9 are provided whereby ventilation of the living chamber is permitted, the same being preferably shielded from winds and storms by means of skirts 10—10 formed upon the exterior of the hive and spaced therefrom.

The chamber 1 is designed to provide a living room for the bees, and the working and storage chambers are preferably located above the same. To this end I provide above the chamber 1 an upper chamber 11 the same preferably resting snugly but detachably upon the side walls of the chamber 1, and above the chamber 11 may be placed a roof 12 of the illustrated or any desired construction.

Beneath the chamber 1 I preferably provide an inclosed basement 13 which may conveniently be formed by securing a platform 14 to the legs 5—5 and inclosing the sides by means of removable walls 15—15. This basement forms an air chamber whereby the bees may be kept warmer in the winter, and also permits the introduction of comb beneath the living chamber whereby the bees may be drawn downwardly to the lower part of the hive if found desirable for any reason. Also it forms a space for the storage of comb, empty sections, and the like. In the upper part of this basement, immediately below the floor 6, I have illustrated a frame 16 having cloth or fine mesh wire 17 secured thereto whereby the circulation of air through the hive may be impeded so as to permit the bees to be kept warmer in the winter but without danger of smothering them. Similarly I have shown a frame 18 over the top of the upper chamber 11 serving to increase the warmth of the hive in winter while keeping it cooler in summer and discouraging robbers.

While my invention is entirely independent of the proportions employed I have illustrated herein a hive of sufficient size to accommodate a plurality of colonies, and I have shown the walls of the living chamber 1 and of the upper chamber 11 as provided with spaced cleats 20—20 forming guideways for the reception of sliding partitions 21 whereby the hive may be divided into a plurality of independent compartments. In the present case I have illustrated four such compartments of equal size, although it will be understood that the number and arrangement of the same may be varied within any limit whatever without departure from my invention.

For the storage of the honey which is to be made or transferred in each section I prefer to employ an interior box or compartment in the upper chamber of each section, owing to the fact that it is desirable to have the sale honey segregated from the rest of the hive for purposes of cleanliness and also from the fact that the bees prefer to store the honey in a quiet, secluded apartment where they think it will be safe for the feeding of the young and for their own future use. These inclosed inner boxes are called supers and the preferred form of the same is shown in Figs. 5, 6 and 7 hereof. This super consists of a rectangular box 25 having end walls 26 and side walls 27. One or both of the end walls is provided with perforations 28 the same being preferably concealed underneath an adjustable slanting portico 29 opening downwardly as toward the living chamber. The super is also formed with a removable bottom 30 which is removed when the super is placed in the chamber 11. The super is supported in place by resting upon brood frames, comb sections, or the like with which the chamber 1 is provided. The ends of the super are preferably provided with lattice spaces 31 spaced from the walls so as to form a passageway therearound, and the bottom may also, if desired, be formed with a lattice floor 32. The upper part of the super is formed with an internal ledge 33 for supporting the comb frames, while the top of the super is preferably covered with a box 34 forming an attic chamber 35. Admission to this chamber is afforded by apertures 36—36 in the walls thereof, said apertures being preferably formed in communication with a passageway 37 whereby access may be had to the attic without passing through the chamber 25 of the super. The floor of the attic is formed by a platform 38 also perforated to permit passage between the two parts of the super.

For supporting the comb sections within the super I employ frames of the type shown in Fig. 10, which consist of a hollow, rectangular skeleton 40 formed at its upper portion with overhanging extensions 41 adapted to rest upon the ledge 33. Within the skeleton 40 the sections 42—42 are supported by wedges 43 in the usual or any suitable manner, the arrangement of the sections being preferably such that the edges of the sections in one frame come opposite the space between adjacent sections of the next frame.

The attic 35 of the super is designed more particularly for feeding honey to the bees in small quantities from time to time so as to induce them to enter the super at as early a time in the spring as possible and to remain in that vicinity at other times of the year, with the effect partly of rendering them accustomed to the location, and partly to increase its warmth, and partly to move the center of population of the hive in this direction. For supporting comb inside of this attic I prefer to employ a frame of the type shown in Figs. 11 and 12 and consisting of a hollow, rectangular skeleton 50 which may be divided into two or more sections as by means of the double partition 51, and whose separate portions are each preferably divided by diagonally arranged double partitions 52. The two parts of each partition are spaced apart by suitable blocks so as to form hollow spaces for the passage of the bees, and the regions between these partitions and the sides of the frame are filled with comb as in the case of any other frame. These frames are ordinarily set in upright position inside the super attic and spaced apart the desired distance in any suitable or convenient manner. In the present instance I have shown clips secured to the end portions of the frames and serving to define the distance of the same apart from each other and from the ends and sides of the inclosing space. In the present embodiment each of these clips consists of a bracket-shaped metal device having a pair of laterally extending arms 53—53 terminating in loops 54—54 adapted to receive between them the sides of the frame 50. Each of these clips is secured in place by means of a spring wire 55 bent substantially to M shape as shown in Fig. 12. The clips at one end of the frame are preferably formed with a fin 56 at their backs arranged to space the frame 50 from that end of the wall. The clips at the other end may be plain as shown in Fig. 14.

In Figs. 15 to 18 inclusive I have illustrated a modified form of super consisting merely of a rectangular, hollow tray having side walls 60, end walls 61 and a slatted bottom 62. The size and arrangement of the slats are such as to take the comb sections as illustrated in Figs. 15 and 16, the spaces between adjacent sections registering with the spaces between the slats so as to permit free admission to the bees from below. The height of the walls is slightly greater than the width of the comb sections so that succeeding trays can be piled on top of the first tray, and the end walls 61 are preferably formed with perforations 63 to permit the passage of the bees. One end of each tray is preferably provided with spacing blocks 64 so as to define its position inside of the upper chamber. Adjacent trays being turned so that these blocks will face in the same direction, thus always affording a pasageway for the bees between the top and bottom of the hive.

In Figs. 20 to 22 I have shown the brood frames which I prefer to employ. These consist preferably of open rectangular frames but are preferably not subdivided into small sections as in the case in the sections made for sale inasmuch as the bees do not like the small sections and can be induced to build comb and honey therein only with difficulty. In order to stiffen the frame and support the comb and prevent its buckling or warping under strain or high temperature diagonal wires 66 are frequently used. However, when the entire frame is filled with honey it increases considerably the distance of travel of the bees to have to find their way around the edges of the same wherefore I have devised an attachment which is secured to these wires and keep a passageway open through an intermediate portion of this frame. In its preferred embodiment this attachment consists of four sets of light metal angle iron strips arranged in pairs with their flanges separated by blocks 68. The remaining flanges of each pair are applied to the remaining flanges of the other pair so as to clamp between them the wires 66. Inasmuch as these attachments can be moved in any desired position within the frame it will be apparent that this passageway can be located wherever found desirable.

In Figs. 21 and 22 I have shown a modified form of the frame comprising a skeleton 69 having one or more of its sides surrounded with a sheet metal sheath 70 which is formed interiorly with a projecting rib 71. Double partitions 72—72 are employed, the ends of these partitions being slotted as at 73 and held in place by being applied to the rib 71 as shown in Fig. 22.

In order to minimize the effect of storms, and to keep the interior of the hive at a more uniform temperature I prefer to locate in front of the main entrance door a movable shield or portico 105. Preferably this portico extends downwardly for a distance below the entrance and overhangs to some extent the lighting shelf 106, thus preventing snow from lodging upon this shelf in winter which might have a tendency to suffocate the bees.

The shielding of the interior of the hive from changes in the weather is also increased by the use of hollow cells 107 set around the sides of the chamber 1. Preferably these cells are of detachable construction so as to be moved about or removed at pleasure, and may either consist of the hollow boxes shown at 108 as included between the end of the hive and the partitions 21—21 or may extend from one side of the hive.

For feeding the bees, either honey or sugar, I provide about the interior wall of the hive a plurality of hollow movable cells shown at 105 and 106, the same being located preferably at the points adjacent to or across the entrances 8. The bottoms of these cells are provided with gratings 107 beneath which the bees can pass to and from the entrances. The entrances themselves are preferably of somewhat greater size than is customary in former bee hives and to protect the same from storms and enemies a movable portico 108 is provided upon the exterior of the hive. This portico extends from the skirt 10 to a point somewhat beneath the entrances 8, and beneath this portico is provided the alighting ledge 109 which is preferably of less width than the portico so as to keep it dry and free from snow in winter and more easily defended against enemies. The cells may either extend only for a part of the distance along the wall of the hive as at 105 or may be of the full width of the hive as at 106. In either case their location adjacent the entrances gives the bees a feeling that the sweets therein are not in a secure place and so induces them to transfer the same to a safer location. The position of these feeding cells inside of the hive enables the bees to work during a longer season than if they were obliged to go outside for their honey, and the unusual size of the entrances 108 has the same effect, particularly as the removable character of the porticos 108 permits them to be displaced from time to time thus admitting more light to the hive. However, if by habit the bees become accustomed to this location for the honey and indicate a desire to inhabit these portions, the remedy is to remove the cells and transfer any comb which may be in the same to some other part of the hive such as the basement 13 or the space between the floor 6 and mesh wire 17 (see 125, Fig. 3). After a few days or weeks these cells may be replaced and feeding inside them resumed. In addition to their use as feeding chambers, these cells form an additional vestibule to the hive producing a kind of air chamber and shielding the interior from changes of the weather.

In case it be desired to divide the living chamber of the hive into a greater number of compartments or to reduce the size of those compartments temporarily, as might be the case in the winter when the bees compact themselves into a very much smaller space than at other times, I propose to employ a division board of the type shown in Fig. 9, same comprising a web 115 adapted to extend from wall to wall of the chamber in which it is placed and preferably having a projection 116 adapted to rest upon the top of the living room walls so as to maintain the partition in upright position. The uppermost portion of this partition is preferably split longitudinally to provide a separate jaw 117 which is hinged to the partition proper at 118. Paper, cloth or the like material may be inserted beneath this jaw as shown at 119 and retained in place therein by the buttons 120. The partition proper may be provided with notches, apertures, etc., for the passage of the bees, or these may be left solid or may be closed with wax should occasion demand. This expedient, taken in conjunction with the partitions 21—21, produces a hive whose interior spaces can be enlarged or contracted as necessary for the varying seasons and the varying sizes of swarms.

Ordinarily the bees will dwell mainly in the chamber 1, and here will be kept most of the brood comb. The super being a closed dark box located immediately above this chamber affords the bee a feeling of security in depositing its honey inside thereof and is also advantageous as requiring an upward movement of the laden bees which is apparently easier than a downward movement. The provision of a portico 29 or closed passageway 37 in front of the entrances to the super affords complete darkness therewithin and renders it, to the bees' instinct, a much safer place than the comparatively exposed feeding cells.

When it is desired to feed the bees either honey for transfer purposes or sugar for summer feeding, these substances are placed inside the cells 108 or 109, whereupon the bees, being alarmed for the safety of the sweets owing to the exposed condition of these places, will immediately begin to transfer the same to the sections in the super since these are so arranged as to afford them a feeling of comparatively great security. The provision of an attic above the super permits the introduction of comb (either with or without honey) at this point which always has a tendency to attract the bees, and thus lures them into and around the super and increases in their estimation its desirability and safety as a place of storage. In case the bees shall become reconciled to the location of comb or honey inside the cells 108 and 109, the cells are removed, or shifted, or rearranged, or otherwise disturbed so as to upset this confidence. At the same time it is desirable to effect this feeding inside of the limits of the hive since this facilitates the work of transfer and permits the same to be done through a longer season than would be the case if the bees were obliged to leave the hive for the supplies. Likewise if the bees tend to become too inhabitive in the attic of the super, any comb which may be there may be removed until this habit is broken up.

In addition the location of the feeding cells around the exterior of the beehive forms an added shield against the weather and diminishes the danger that the bees will become restless during any accidental short heated season in the early spring which might cause them to make war upon each other in case there were more than one queen or one colony within the hive, and likewise prevent an undue interference with the work by the occurrence of an occasional cool day in the summer. The improvements in the frames and other subsidiary appliances heretofore mentioned are aimed to increase the facility of labor and therefore increase the amount of honey which can be transferred within a given time.

What I claim is:—

1. In a beehive, an inclosing structure having passages in its walls and removable partitions adapted to be located within said structure whereby the interior space may be subdivided, there being passageways through said walls and communicating with each subdivision.

2. In a beehive, an inclosing structure having parallel walls and guideways formed in said walls, and slidable partitions located in said guideways, there being passageways formed in said walls and opening into the compartments defined by said partitions.

3. A beehive comprising, in combination, a living chamber and an upper chamber, and alined, removable partitions located in said chambers and serving to divide the hive-interior into a plurality of independent compartments adapted to house separate colonies.

4. In a beehive, the combination, with a living chamber having entrances and an inner chamber adapted to receive comb sections, of a hollow cell adapted to be inserted into said living chamber near said entrances and arranged for the feeding of the bees, said cell communicating both with said entrances and with said inner chamber.

5. In a beehive, the combination, with a living chamber having entrances in its outer wall and an upper chamber communicating with said living chamber and adapted to receive a super, of a movable hollow cell adapted to be inserted in said living chamber adjacent to said outer wall, and a slatted floor for said cell spaced above said entrances and arranged to receive sweets with which the bees are fed.

6. In a beehive, the combination, with a chamber having entrance apertures in its outer walls and a darkened inner chamber adapted to receive the comb sections, of a plurality of feeding cells arranged in said living chamber in proximity to said entrance apertures and a removable portico carried by the hive exterior and adapted to shield said entrance apertures.

7. In a beehive, a living chamber, a darkened, interior storage chamber communicating with the living chamber, feeding cells located in said living chamber, and means for varying the illumination of said feeding cells.

8. In a beehive, the combination, with inclosing walls, of a super smaller than said walls and adapted to be received therein, said super having entrance apertures and a portico covering said apertures.

9. In a beehive, the combination, with inclosing walls, of a super smaller than said walls and adapted to be received therein, said super having an attic, and means for supporting comb in said attic, said attic being accessible both from the main chamber of the super and independently thereof.

10. In a device of the character described, the combination with a super and a plurality of frames adapted to be hung therein, each of said frames being adapted to contain a plurality of comb sections, of means for securing said sections in said frames with their edges spaced apart so as to provide a passageway therebetween, said securing means being arranged so as to bring the edges of the sections in one frame opposite the passageways in the adjacent frames.

EDSON HAINS.

Witnesses:
ALEX. SCOTT,
B. OLIVE.

Copies of this patent may be obtained for five cents each, by addressing the "Commissioner of Patents, Washington, D. C."